United States Patent
Merker et al.

(10) Patent No.: US 6,987,663 B2
(45) Date of Patent: Jan. 17, 2006

(54) ELECTROLYTIC CAPACITORS WITH A POLYMERIC OUTER LAYER

(75) Inventors: Udo Merker, Köln (DE); Klaus Wussow, Netphen (DE); Friedrich Jonas, Aachen (DE)

(73) Assignee: H.C. Starck GmbH, Goslar (DE)

( * ) Notice: Subject to any disclaimer, the term of this patent is extended or adjusted under 35 U.S.C. 154(b) by 1 day.

(21) Appl. No.: 10/964,463

(22) Filed: Oct. 13, 2004

(65) Prior Publication Data

US 2005/0111165 A1    May 26, 2005

(30) Foreign Application Priority Data

Oct. 17, 2003   (DE) ................................. 103 49 112
May 7, 2004    (DE) ...................... 10 2004 022 674

(51) Int. Cl.
   *H01G 9/00*       (2006.01)
(52) U.S. Cl. ..................... 361/523; 361/532; 29/25.03; 252/500
(58) Field of Classification Search ................ 361/523, 361/524, 525, 528, 529, 530, 531, 532; 252/500, 252/62.2, 518–519, 510
   See application file for complete search history.

(56) References Cited

U.S. PATENT DOCUMENTS

| | | | | |
|---|---|---|---|---|
| 4,910,645 | A | 3/1990 | Jonas et al. | 361/525 |
| 6,001,281 | A | 12/1999 | Lessner et al. | 252/500 |
| 6,462,936 | B1 * | 10/2002 | Fujimoto et al. | 361/525 |
| 6,852,250 | B2 * | 2/2005 | Haghighat et al. | 252/500 |
| 6,882,522 | B2 * | 4/2005 | Naito et al. | 361/523 |

* cited by examiner

*Primary Examiner*—Anthony Dinkins
(74) *Attorney, Agent, or Firm*—Joseph C. Gil; James R. Franks

(57) ABSTRACT

Electrolytic capacitors having low equivalent series resistance and low leakage current are described. The electrolytic capacitors include a solid electrolyte layer of a conductive material in particular a conductive polymer, and an outer layer that includes binders, polymeric anions and conductive polymers (e.g., polythiophenes). Also described is a method of preparing electrolytic capacitors that involves forming the conductive polymer of the solid electrolyte layer in situ by means of chemical oxidative polymerization or electrochemical polymerization. Electronic circuits that include the electrolytic capacitors are also described.

30 Claims, 3 Drawing Sheets

ELECTROLYTIC CAPACITORS WITH A POLYMERIC OUTER LAYER

CROSS REFERENCE TO RELATED PATENT APPLICATION

The present patent application claims the right of priority under 35 U.S.C. §119 (a)-(d) of German Patent Application No. 103 49 112.0, filed Oct. 17, 2003.

FIELD OF THE INVENTION

The invention relates to electrolytic capacitors with low equivalent series resistance and low leakage current consisting of a solid electrolyte made of conductive polymers and an outer layer containing conductive polymers and polymeric anions, to the production thereof and to the use of such electrolytic capacitors.

BACKGROUND OF THE INVENTION

A solid electrolytic capacitor generally consists of a porous metal electrode, an oxide layer located on the metal surface, an electrically conductive solid introduced into the porous structure, an outer electrode, such as a silver layer, and further electric contacts and encapsulation.

Examples of solid electrolytic capacitors are tantalum, aluminium, niobium and niobium oxide capacitors with charge transfer complexes, manganese dioxide or polymeric solid electrolytes. The use of porous bodies has the advantage that very high capacity densities (i.e. high capacitance) may be achieved in a small space owing to the large surface area.

π-conjugated polymers are particularly suitable as solid electrolytes owing to their high electrical conductivity. π-conjugated polymers are also called conductive polymers or synthetic metals. They are becoming increasingly important economically, as polymers have advantages over metals, with respect to processability, weight and the targeted adjustment of properties by chemical modification. Polypyrroles, polythiophenes, polyanilines, polyacetylenes, polyphenylenes and poly(p-phenylene-vinylenes) are examples of known π-conjugated polymers, poly-3,4-(ethylene-1,2-dioxy)thiophene, often also called poly(3,4-ethylenedioxythiophene), being a particularly important, industrially used polythiophene, as it has very high conductivity in its oxidised form.

Technical development in electronics increasingly requires solid electrolytic capacitors with very low equivalent series resistance (ESR). This is due, for example, to decreasing logic voltages, a higher integration density and increasing clock frequencies in integrated circuits. A low ESR also reduces the energy consumption, and this is particularly advantageous for mobile, battery-operated applications. There is therefore a wish to reduce the ESR of solid electrolytic capacitors as far as possible.

European patent specification EP-A 340 512 describes the production of a solid electrolyte made of 3,4-ethylene-1,2-dioxythiophene and the use of its cationic polymer produced by oxidative polymerisation as the solid electrolyte in electrolytic capacitors. Poly(3,4-ethylenedioxythiophene) as a substitute for manganese dioxide or charge transfer complex in the solid electrolytic capacitors reduces the equivalent series resistance of the capacitor owing to the higher electrical conductivity and improves the frequency behaviour.

In addition to a low ESR, modern solid electrolytic capacitors require a low leakage current and good stability with respect to external stresses. High mechanical stresses that may greatly increase the leakage current of the capacitor anode occur in particular during the production process when encapsulating the capacitor anodes.

Stability toward such stresses and therefore a low leakage current may primarily be achieved by an approximately 5 to 50 $\mu$m thick outer layer made of conductive polymers on the capacitor anode. Such a layer is used as a mechanical buffer between the capacitor anode and the cathode-side electrode. This prevents the electrode, for example when mechanically stressed, from coming into direct contact with the anode or from damaging it and thus increasing the leakage current of the capacitor. The conductive polymeric outer layer itself exhibits what is known as self-healing behaviour: relatively small defects in the dielectric on the outer anode surface, which occur despite the buffer effect, are electrically insulated by the conductivity of the outer layer being destroyed at the defective point by the electric current.

The formation of a thick outer layer by in situ polymerisation is very difficult. Layer formation requires a very large number of coating cycles in this process. As a result of the large number of coating cycles, the outer layer is coated very unevenly, in particular the edges of the capacitor anode are often inadequately covered. Japanese patent application JP-A 2003-188052 recites that homogeneous edge coverage requires extensive matching of the processing parameters. However, this makes the production process very susceptible to interruptions. An addition of binder materials for quicker layer build-up is also difficult, as the binder materials hinder the oxidative in situ polymerisation. In addition, the layer polymerised in situ generally has to be freed from residual salts by washing, whereby holes are produced in the polymer layer.

A dense outer layer with good edge coverage may be achieved by electrochemical polymerisation. However, electrochemical polymerisation requires that firstly a conductive foil be deposited on the insulating oxide layer of the capacitor anode and that this layer is then electrically contacted for each individual capacitor. This contacting can be very complex in mass production and may damage the oxide layer.

The use of formulations containing the powder of a conductive polymer and binders have excessive electrical resistance owing to the high contact resistance between the individual powder particles, for them to allow production of solid electrolytic capacitors with low ESR.

In Japanese patent applications JP-A 2001-102255 and JP-A 2001-060535, a layer of polyethylenedioxythiophene/polystyrene sulphonic acid (PEDT/PSS), also called polyethylenedioxythiophene/polystyrene sulphonic acid complex or PEDT/PSS complex, is applied directly to the oxide film to protect the oxide film and for improved adhesion of the solid electrolyte to the oxide film. The outer layer is then applied to this layer by in situ polymerisation or by impregnation of the capacitor anode with tetracyanoquinodimethane salt solution. However, this process has the drawback that the PEDT/PSS complex does not penetrate into porous anode bodies with small pores. Consequently, modern, highly porous anode materials cannot be used.

U.S. Pat. No. 6,001,281 describes, in the examples, capacitors with a solid electrolyte made of polyethylenedioxythiophene (PEDT) produced in situ and an outer layer made of PEDT/PSS complex. However, the drawback of these capacitors is that they have a high ESR of 130 m$\Omega$ and higher.

There is therefore still a need for solid electrolytic capacitors with low equivalent series resistance (ESR), that have a dense polymeric outer layer with good edge coverage and a low leakage current. There is also still a need for a process for producing such capacitors.

SUMMARY OF THE INVENTION

The object was therefore to provide such capacitors.

It has surprisingly been found that solid electrolytic capacitors, that have a solid electrolyte made of a conductive material, preferably a conductive polymer and an outer layer containing a polymeric anion, polyanilines and/or polythiophenes and a binder, meet these requirements.

The present invention therefore relates to an electrolytic capacitor comprising
- a porous electrode body of an electrode material,
- a dielectric covering the surface of this electrode material,
- a solid electrolyte comprising a conductive material, preferably a conductive polymer that wholly or partially covers the dielectric surface,
- a layer over the entire external surface or a portion of the external surface of the porous electrode body covered by a dielectric and wholly or partially by a solid electrolyte, comprising at least one polymeric anion and at least one optionally substituted polyaniline and/or at least one polythiophene with recurring units of general formula (I), (II) or recurring units of general formula (I) and (II).

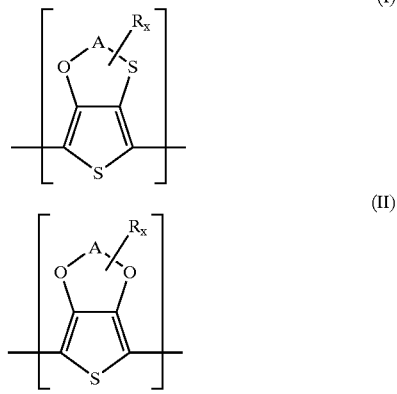

wherein

A represents an optionally substituted $C_1$ to $C_5$ alkylene radical,

R represents a linear or branched, optionally substituted $C_1$ to $C_{18}$ alkyl radical, an optionally substituted $C_5$ to $C_{12}$ cycloalkyl radical, an optionally substituted $C_6$ to $C_{14}$ aryl radical, an optionally substituted $C_7$ to $C_{18}$ aralkyl radical, an optionally substituted $C_1$ to $C_4$ hydroxyalkyl radical or a hydroxyl radical, x represents an integer from 0 to 8 and if a plurality of radicals R are bound to A, these may be the same or different, characterised in that the layer comprising at least one polymeric anion and at least one optionally substituted polyaniline and/or at least one polythiophene with recurring units of general formula (I), (II) or recurring units of general formula (I) and (II) comprises at least one binder.

General formulae (I) and (II) are to be understood such that the substituent R may be bound x times to the alkylene radical A.

The features that characterize the present invention are pointed out with particularity in the claims, which are annexed to and form a part of this disclosure. These and other features of the invention, its operating advantages and the specific objects obtained by its use will be more fully understood from the following detailed description and accompanying drawings in which preferred embodiments of the invention are illustrated and described.

Unless otherwise indicated, all numbers or expressions used in the specification and claims are understood as modified in all instances by the term "about."

BRIEF DESCRIPTION OF THE DRAWINGS

In FIGS. 1–3, like reference numerals designate the same components and structural features.

DETAILED DESCRIPTION OF THE INVENTION

Figure 1:
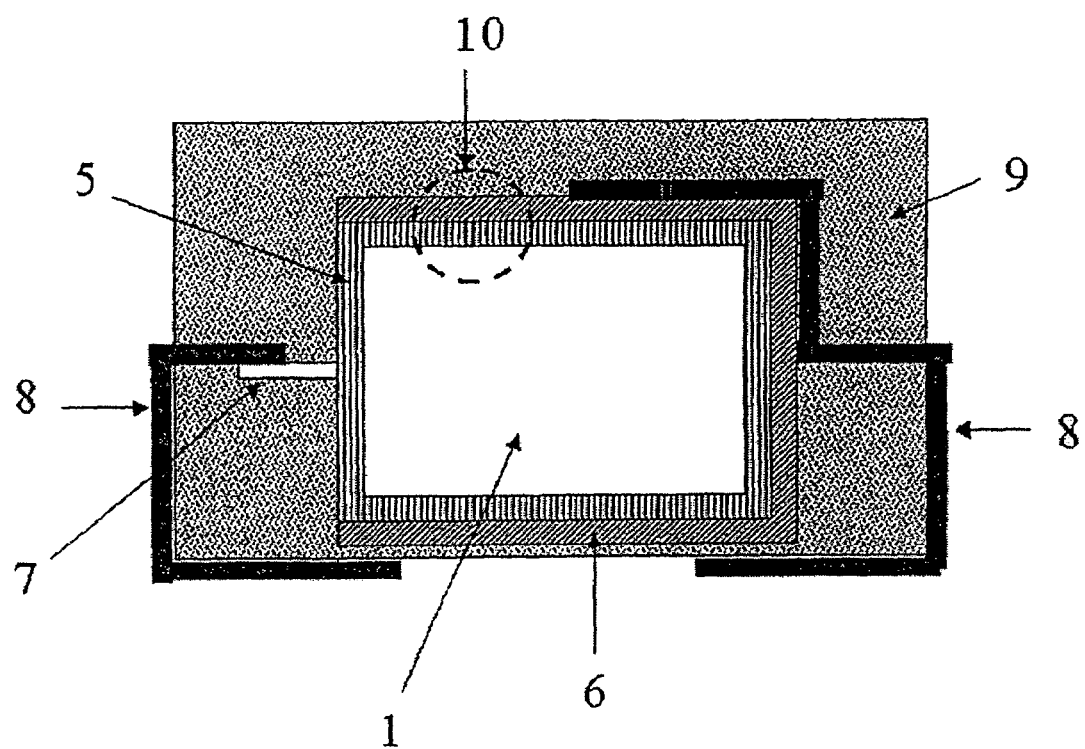
FIG. 1 is representative diagram of the structure of a solid electrolytic capacitor according to the present invention.

The electrode material preferably forms a porous body with a large surface area, for example in the form of a porous sintered compact or an etched foil, in the electrolytic capacitor according to the invention. This will also be shortened to electrode body hereinafter.

The electrode body covered with a dielectric will also be shortened to oxidised electrode body hereinafter. The term "oxidised electrode body" also includes electrode bodies that are covered by a dielectric, which was not produced by oxidation of the electrode body.

The electrode body covered with a dielectric and wholly or partially with a solid electrolyte will also be shortened to capacitor body hereinafter.

The layer comprising at least one polymeric anion and at least one optionally substituted polyaniline and/or at least one polythiophene with recurring units of general formula (I), (II) or recurring units of general formulae (I) and (II), that are located on the external surface, will be called the polymeric outer layer hereinafter.

The polymeric outer layer preferably comprises at least one polymeric organic binder. Examples of polymeric, organic binders include polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid esters, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulphones, melamine formaldehyde resins, epoxide resins, silicone resins or celluloses. Further polymeric organic binder within the scope of the invention also include those which may be produced by adding crosslinking agents, such as melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins and subsequent crosslinking. Crosslinking products of this type suitable as polymeric binders may also be formed, for example, by reacting the added crosslinking agents with the polymeric anions. In this case, the crosslinked polyanion in the polymeric outer layer then assumes the function of the polymeric anion and of the binder. Capacitors containing crosslinked polyanions of this type are also to be understood as capacitors within the scope of this invention. Binders that are sufficiently stable to heat to resist the temperatures to which the finished capacitors are subsequently exposed, for example soldering temperatures of 220 to 260° C., are preferred.

The polymeric binder content in the outer layer is 1 to 90%, preferably 5 to 80% and more preferably 20 to 60%.

According to the invention, the term "polymers" includes all compounds with more than one identical or different repeating unit.

Conductive polymers are taken to mean the category of π-conjugated polymers that have electrical conductivity after oxidation or reduction. π-conjugated polymers from conductive polymers that have electrical conductivity after oxidation are preferred according to the invention.

Within the context of the invention, the prefix poly is taken to mean that more than one identical or different recurring unit is contained in the polymer or polythiophene. The polythiophenes contain a total of n recurring units of general formula (I), (II) or of general formulae (I) and (II), n being an integer from 2 to 2,000, preferably 2 to 100. The recurring units of general formula (I) and/or (II) may each be the same or different within a polythiophene. Polythiophenes with identical recurring units of general formula (formulae) (I), (II) or (I) and (II) in each case are preferred.

At the terminal groups, the polythiophenes each preferably carry H.

The solid electrolyte may contain optionally substituted polythiophenes, polypyrroles and polyanilines as the conductive polymers.

Preferred conductive polymers according to the invention are polythiophenes with recurring units of general formula (I), (II) or recurring units of general formula (I) and (II), wherein A, R and X have the meaning given above for general formulae (I) and (II).

Polythiophenes with recurring units of general formula (I), (II) or recurring units of general formula (I) and (II), wherein A represents an optionally substituted $C_2$ to $C_3$ alkylene radical and x represents 0 or 1, are particularly preferred.

Poly(3,4-ethylenedioxythiophene) is most preferred as the conductive polymer of the solid electrolyte.

$C_1$ to $C_5$ alkylene radicals A, within the scope of the invention, are methylene, ethylene, n-propylene, n-butylene or n-pentylene. Within the context of the invention $C_1$ to $C_{18}$ alkyl represents linear or branched $C_1$ to $C_{18}$ alkyl radicals such as methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl or n-octadecyl, $C_5$ to $C_{12}$ cycloalkyl for $C_5$ to $C_{12}$ cycloalkyl radicals such as cyclopentyl, cyclohexyl, cycloheptyl, cyclooctyl, cyclononyl or cyclodecyl, $C_5$ to $C_{14}$ aryl for $C_5$ to $C_{14}$ aryl radicals such as phenyl or naphthyl, and $C_7$ to $C_{18}$ aralkyl for $C_7$ to $C_{18}$ aralkyl radicals, such as benzyl, o-, m-, p-tolyl, 2,3-, 2,4-, 2,5-, 2-6,3-4-, 3,5-xylyl or mesityl. The preceding list is used by way of example to illustrate the invention and should not be regarded as conclusive.

Numerous organic groups may be considered as optional further substituents for $C_1$ to $C_5$ alkylene radicals A, for example alkyl, cycloalkyl, aryl, halogen, ether, thioether, disulphide, sulphoxide, sulphone, sulphonate, amino, aldehyde, keto, carboxylic acid ester, carboxylic acid, carbonate, carboxylate, cyano, alkylsilane and alkoxysilane groups and carboxylamide groups.

The polythiophenes contained as the solid electrolyte in the electrolytic capacitors according to the invention may be neutral or cationic. In preferred embodiments they are cationic, "cationic" only referring to the charges located on the polythiophene main chain. Depending on the substituent on the radicals R, the polythiophenes may carry positive and negative charges in the structural unit, the positive charges being located on the polythiophene main chain and the negative charges optionally on the radicals R substituted by sulphonate or carboxylate groups. In this case the positive charges of the polythiophene main chain may be partially or wholly saturated with the optionally present anionic groups on the radicals R. Viewed overall, the polythiophenes may, in these cases, be cationic, neutral or even anionic. Nevertheless, they are all regarded as cationic polythiophenes within the scope of the invention as the positive charges on the polythiophene main chain are crucial. The positive charges are not illustrated in the formulae as their exact number and position cannot be perfectly established. However, the number of positive charges is at least one and at most n, n being the total number of all recurring units (identical or different) within the polythiophene.

To compensate the positive charge, if this has not already taken place as a result of the optionally sulphonate- or carboxylate-substituted and therefore negatively charged radicals R, the cationic polythiophenes require anions as the counterions.

Counterions may be monomeric or polymeric anions, the latter also being called polyanions hereinafter.

Polymeric anions can, for example, be anions of polymeric carboxylic acids, such as polyacrylic acids, polymethacrylic acid or polymaleic acids or polymeric sulphonic acids, such as polystyrene sulphonic acids and polyvinyl sulphonic acids. These polycarboxylic and sulphonic acids may also be copolymers of vinyl carboxylic and vinyl sulphonic acids with other polymerisable monomers, such as acrylic acid esters and styrene.

Preferably, monomeric anions are used for the solid electrolytes as they penetrate better into the oxidised electrode body.

Suitable monomeric anions include, for example, those of $C_1$ to $C_{20}$ alkane sulphonic acids, such as the methane, ethane, propane, butane or higher sulphonic acids, such as dodecane sulphonic acid, of aliphatic perfluorosulphonic acids, such as trifluoromethane sulphonic acid, perfluorobutane sulphonic acid or the perfluorooctane sulphonic acid, of aliphatic $C_1$ to $C_{20}$ carboxylic acids such as 2-ethyl-hexylcarboxylic acid, of aliphatic perfluorocarboxylic acids, such as trifluoroacetic acid or perfluorooctanoic acid, and of aromatic sulphonic acids optionally substituted by $C_1$ to $C_{20}$ alkyl groups, such as benzene sulphonic acid, o-toluene sulphonic acid, p-toluene sulphonic acid or dodecylbenzene sulphonic acid and of cycloalkane sulphonic acids such as camphor sulphonic acid or tetrafluoroborates, hexafluorophosphates, perchlorates, hexafluoroantimonates, hexafluoroarsenates or hexachloroantimonates.

The anions of p-toluene sulphonic acid, methane sulphonic acid or camphor sulphonic acid are preferred.

Cationic polythiophenes that contain anions as counterions for charge compensation are often also known by experts as polythiophene/(poly)anion complexes.

Apart from the conductive polymers and optionally also counterions, the solid electrolyte may contain binders, crosslinking agents, surface-active substances, such as ionic or non-ionic surfactants or adhesives and/or further additives.

Adhesives are, for example, organofunctional silanes and their hydrolysates, for example 3-glycidoxypropyltrialkyloxysilane, 3-aminopropyltriethoxysilane, 3-mecaptopropyltrimethoxysilane, 3-metacryloxypropyltrimethoxysilane, vinyltrimethoxysilane or octyltriethoxysilane.

The solid electrolyte preferably basically comprises the conductive polymer and monomeric anions as the counterions.

The solid electrolyte preferably forms, on the dielectric surface, a layer with a thickness of less than 200 nm, particularly preferably less than 100 nm, more preferably less than 50 nm.

The covering of the dielectric with the solid electrolyte is determined within the scope of this invention as follows: the capacitance of the capacitor is measured in the dry and moist state at 120 Hz. The degree of coverage is the ratio of the capacitance in the dry state to the capacitance in the moist state, expressed as a percentage. Dry state means that the capacitor has been dried over several hours at elevated temperature (80 to 120° C.) before it is measured. Moist state means that the capacitor has been exposed to saturated atmospheric moisture over several hours at elevated pressure, for example in a vapour pressure vessel. The moisture penetrates into pores that are not covered by the solid electrolyte and acts as a liquid electrolyte therein.

The coverage of the dielectric by the solid electrolyte is preferably greater than 50%, particularly preferably greater than 70%, more preferably greater than 80%.

External surface is taken to mean the outer sides of the capacitor body. According to the invention and as shown schematically and by way of example in FIG. 1 and FIG. 2, the polymeric outer layer is located on all of the other faces or a portion of thereof.

Figure 2:
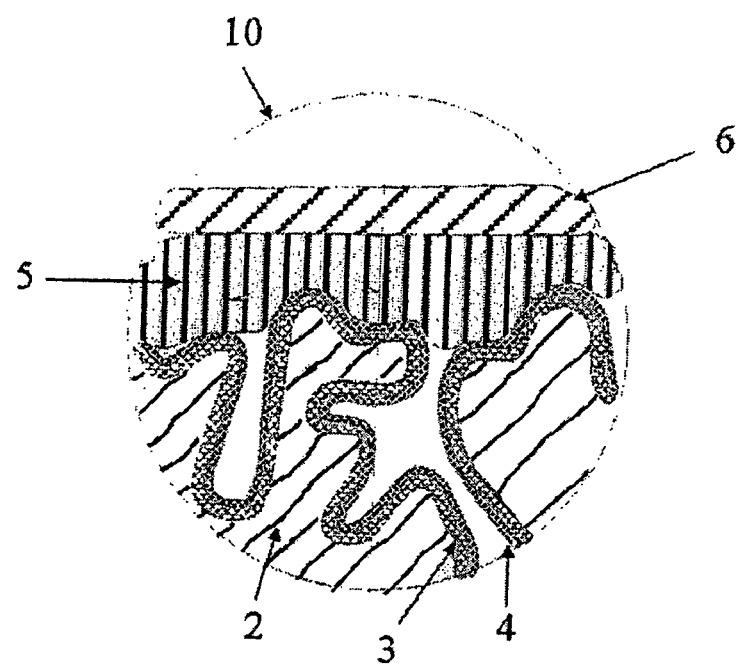
FIG. 2 is an enlarged representative diagram of detail area (10) of FIG. 1.

FIG. 1 is a diagram showing the structure of a solid electrolytic capacitor in the example of a tantalum capacitor comprising 1 capacitor body
5 polymeric outer layer
6 graphite/silver layer
7 wire contact to the electrode body
8 contacts
9 encapsulation
10 detail FIG. 2 shows the enlarged detail 10 from FIG. 1 that reproduces the schematic layer structure of the tantalum capacitor comprising

| | |
|---|---|
| 10 | detail |
| 2 | porous electrode body |
| 3 | dielectric |
| 4 | solid electrolyte |
| 5 | polymeric outer layer |
| 6 | graphite/silver layer |

Geometric surface area is hereinafter taken to mean the outer face of the capacitor body that is obtained from the geometric dimensions. For right parallelepiped sintered compacts the geometric surface area is accordingly:

$$\text{geometric surface area} = 2(L*B + L*H + B*H),$$

wherein L is the length, B the width and H the height of the body and * represents the multiplication sign. Only a portion of the capacitor body on which the polymeric outer layer is located is examined.

If a plurality of capacitor bodies are used in a capacitor, then the individual geometric surface areas add up to a total geometric surface area.

For solid electrolytic capacitors that contain, for example, a wound foil as the porous electrode body, the dimensions of the developed foil (length, width) are used as measurements.

Instead of solid electrolytes containing a conductive polymer, the solid electrolytic capacitors may also contain solid electrolytes containing a non-polymeric conductive material, such as charge transfer complexes, such as TCNQ (7,7,8,8-tetracyano-1,4-quinodimethane), manganese oxide or salts, for example those which can form ionic liquids. The polymeric outer layer also leads to lower leakage currents in solid electrolytic capacitors of this type.

The same preferential ranges as for the polythiophenes in the solid electrolyte apply to the polythiophenes with recurring units of general formula (I), (II) or recurring units of general formula (I) and (II) located in the polymeric outer layer.

The polymeric anion may function as the counterion for the polyanilines and/or the polythiophenes with recurring units of general formula (I), (II) or recurring units of general formula (I) and (II). However, additional counterions may also be provided in the layer. However, the polymeric anion is preferably used as the counterion in this layer.

Polymeric anions may, for example, be anions of polymeric carboxylic acids, such as polyacrylic acids, polymethacrylic acid or polymaleic acids or polymeric sulphonic acids, such as polystyrene sulphonic acids and polyvinyl sulphonic acids. These polycarboxylic and sulphonic acids may also be copolymers of vinylcarboxylic and vinylsulphonic acids with other polymerisable monomers, such as acrylic acid esters and styrene.

An anion of a polymeric carboxylic or sulphonic acid is preferred as the polymeric anion.

The anion of polystyrene sulphonic acid (PSS) is preferred as the polymeric anion. The molecular weight of the polyacids providing the polyanions is preferably 1,000 to 2,000,000, preferably 2,000 to 500,000. The polyacids or their alkali metal salts are commercially available, for example polystyrene sulphonic acids and polyacrylic acids, or else may be produced by known processes (see, for example, Houben Weyl, Processen der organischen Chemie, vol. E 20 Makromolekulare Stoffe, part 2, (1987), p. 1141 ff).

Polymeric anion(s) and polythiophene(s) and/or polyaniline(s) may be present in the polymeric outer layer in a ratio by weight of 0.5:1 to 50:1, preferably 1:1 to 30:1, particularly preferably 2:1 to 20:1. The weight of polythiophenes and/or polyanilines corresponds here to the weighed-in portion of the monomers used, assuming that there is a complete conversion during polymerisation.

The polymeric outer layer may also contain monomeric anions. The same preferred ranges as listed above for the solid electrolyte apply to the monomeric anions.

The polymeric outer layer may also contain further components such as surface-active substances, for example ionic and non-ionic surfactants or adhesives, such as organofunctional silanes or their hydrolysates, for example 3 -glycidoxypropyltrialkoxysilane, 3-aminopropyl-triethoxysilane, 3-mercaptopropyl-trimethoxysilane, 3-metacryloxypropyltrimethoxysilane, vinyltrimethoxysilane or octyltriethoxysilane.

The thickness of the polymeric outer layer is 1 to 1,000 μm, preferably 1 to 100 μm, particularly preferably 2 to 50 μm, more preferably 4 to 20 μm. The layer thickness may vary on the external surface. In particular, the layer thickness may be thicker or thinner at the edges of the capacitor body than on the lateral faces of the capacitor body. A layer of virtually homogeneous thickness is preferred.

The polymeric outer layer may have a homogeneous or inhomogeneous distribution with respect to its composition relative to the binders, conductive polymers and polymeric anions. Homogeneous distributions are preferred.

The polymeric outer layer may be a component of a multi-layer system that forms the outer layer of the capacitor body. Therefore, one or more further functional layers may be located between the solid electrolyte and the polymeric outer layer according to the invention. Further functional layers may also be located on the polymeric outer layer according to the invention. A plurality of polymeric outer layers according to the invention may also be located on the capacitor body.

The polymeric outer layer is preferably located directly on the solid electrolyte. The polymeric outer layer preferably penetrates into the edge region of the capacitor body to achieve good electrical contact with the solid electrolyte and to increase the adhesion to the capacitor body, but does not penetrate into the entire depth of all pores (cf. for example FIG. 2).

In a particularly preferred embodiment, the electrolytic capacitor according to the invention contains a solid electrolyte containing poly(3,4-ethylenedioxythiophene) (PEDT) and a polymeric outer layer containing polystyrene sulphonic acid (PSS) and poly(3,4-ethylenedioxythiophene), the latter frequently also being called PEDT/PSS or PEDOT/PSS.

In a particularly preferred embodiment, the electrolytic capacitor according to the invention comprises a solid electrolyte made of poly(3,4-ethylenedioxythiophene) and monomeric counterions and a polymeric outer layer made of PEDT/PSS and a binder.

The present invention also preferably relates to an electrolytic capacitor according to the invention, characterised in that the electrode material is a valve metal or a compound with comparable properties.

Within the scope of the invention, a valve metal is taken to mean metals of which the oxide layers do not allow the flow of current equally in both directions. With anodically applied voltage, the oxide layers of the valve metals block the flow of current, while with cathodically applied voltage, excessive currents occur that may destroy the oxide layer. The valve metals include Be, Mg, Al, Ge, Si, Sn, Sb, Bi, Ti, Zr, Hf, V, Nb, Ta and W and an alloy or compound of at least one of these metals with other elements. The best known representatives of the valve metals are Al, Ta and Nb. Compounds with comparable properties are those with metallic conductivity that may be oxidised and of which the oxide layers have the properties described above. NbO, for example, has metal conductivity but is not generally regarded as a valve metal. However, layers of oxidised NbO have the typical properties of valve metal oxide layers, so NbO or an alloy or compound of NbO with other elements are typical examples of such compounds with comparable properties.

Accordingly, the term "oxidisable metal" is taken to mean not only metals but also an alloy or compound of a metal with other elements, providing they possess metal conductivity and may be oxidised.

Therefore, the present invention particularly preferably relates to an electrolytic capacitor, characterised in that the valve metal or the compound with comparable properties is tantalum, niobium, aluminium, titanium, zirconium, hafnium, vanadium, an alloy or compound of at least one of these metals with other elements, NbO or an alloy or compound of NbO with other elements.

The dielectric preferably consists of an oxide of the electrode material. It optionally contains further elements and/or compounds.

The capacitance of the oxidised electrode body depends on the surface area and the thickness of the dielectric, in addition to the type of dielectric. The charge-mass ratio is a measure of how much charge per unit of weight the oxidised electrode body may absorb. The charge-mass ratio is calculated as follows:

Charge-mass ratio=(capacitance*voltage)/weight of the oxidised electrode body.

The capacitance is obtained from the capacitance of the finished capacitor measured at 120 Hz, and the voltage is the operating voltage of the capacitor (rated voltage). The weight of the oxidised electrode body is based on the mere weight of the porous electrode material coated with dielectric, without polymers, contacts and encapsulation.

The electrolytic capacitors according to the invention preferably have a charge-mass ratio higher than 10,000 μC/g, particularly preferably higher than 20,000 μC/g, more preferably higher than 30,000 μC/g, most preferably higher than 40,000 μC/g.

The solid electrolytic capacitor according to the invention is distinguished by low leakage currents and low equivalent series resistance. As the polymeric outer layer forms a dense layer around the capacitor body and covers the edges thereof very well, the capacitor body is robust with respect to mechanical stresses. In addition, the polymeric outer layer exhibits goods adhesion to the capacitor body and high electrical conductivity, so low equivalent series resistance may be achieved.

The present invention preferably relates to electrolytic capacitors with an ESR measured at 100 kHz of less than 51 mΩ. The ESR of the electrolytic capacitors according to the invention, measured at a frequency of 100 kHz, is particularly preferably less than 31 mΩ, more preferably less than 21 mΩ, most preferably less than 16 mΩ. In particularly preferred embodiments of the electrolytic capacitors according to the invention, the ESR is less than 11 mΩ.

The equivalent series resistance of a solid electrolytic capacitor is inversely proportional to the geometric surface area of the capacitor. The product of the equivalent series resistance and the geometric surface area accordingly provides a variable that is independent of the overall size.

Therefore, the present invention also preferably relates to electrolytic capacitors in which the product of the equivalent series resistance, measured at 100 kHz, and the geometric surface area of the capacitor body is less than 4,000 mΩmm$^2$. The product of the equivalent series resistance and the geometric surface area is particularly preferably less than 3,000 mΩmm$^2$, more preferably less than 2,000 mΩmm$^2$, most preferably less than 1,000 mΩmm$^2$. In particularly preferred embodiments of the electrolytic capacitors according to the invention, the product of the equivalent series resistance and the geometric surface area is less than 600 mΩmm$^2$.

An electrolytic capacitor according to the invention of this type is basically produced as follows: Firstly, a powder, for example, with a large surface area is pressed and sintered to form a porous electrode body. Metal foils may also be etched to obtain a porous foil. The electrode body is then covered with a dielectric, i.e. an oxide layer, for example by electrochemical oxidation. A conductive polymer that forms the solid electrolyte is deposited chemically or electrochemically on the dielectric by oxidative polymerisation. According to the invention, a layer containing at least one polymeric anion and at least one optionally substituted polyaniline and/or polythiophene with recurring units of general formulae (I), (II) or recurring units of general formulae (I) and (II) and at least one binder is then applied from a dispersion to the oxidised electrode body, optionally after applying further layers. Further layers are optionally applied to the polymeric outer layer. A coating with readily conductive layers, such as graphite and silver, or a metal cathode body is used as the electrode to discharge the current. Finally, the capacitor is contacted and encapsulated.

The present invention therefore also relates to a process for producing an electrolytic capacitor according to the invention, whereby the solid electrolyte comprising at least one conductive polymer is produced in that precursors for producing conductive polymers, one or more oxidising agents and optionally counterions, are applied together or in succession, optionally in the form of solutions, to a dielectric—optionally covered with further layers—of a porous electrode body, and are polymerised by chemical oxidation at temperatures of −10° C. to 250° C., or in that precursors for producing conductive polymers and counterions, are polymerised, optionally from solution, by electrochemical polymerisation at temperatures of −78° C. to 250° C. on a dielectric—optionally coated with further layers—of a porous electrode body, and the layer comprising at least one polymeric anion and at least one optionally substituted polyaniline and/or at least one polythiophene with recurring units of general formula (I), (II) or recurring units of general formula (I) and (II)

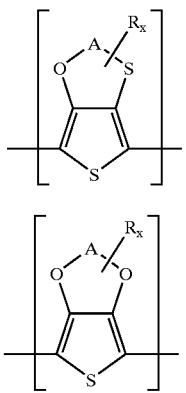

wherein A, R and x have the meaning given above for the general formulae (I) and (II), and at least one binder from a dispersion comprising at least polymeric anion and at least one optionally substituted polyaniline and/or at least one polythiophene with recurring units of general formula (I), (II) or recurring units of general formula (I) and (II) and at least one binder are applied to the capacitor body, optionally after applying further layers.

Precursors for producing conductive polymers, hereinafter also called precursors, are taken to mean corresponding monomers or derivatives thereof. Mixtures of different precursors may also be used. Suitable monomeric precursors include, for example, optionally substituted thiophenes, pyrroles or anilines, preferably optionally substituted thiophenes, particularly preferably optionally substituted 3,4-alkylenedioxythiophenes.

Examples of substituted 3,4-alkylenedioxythiophenes include compounds of general formula (III), (IV) or a mixture of thiophene of general formulae (III) and (IV)

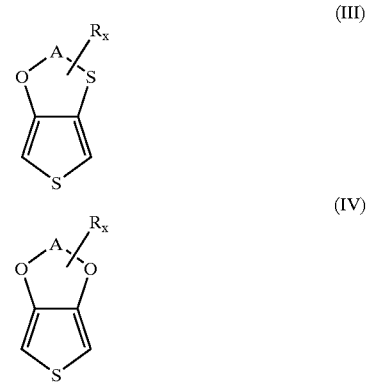

wherein

A represents an optionally substituted $C_1$ to $C_5$ alkylene radical, preferably an optionally substituted $C_2$ to $C_3$ alkylene radical, R represents a linear or branched, optionally substituted $C_1$ to $C_{18}$ alkyl radical, preferably a linear or branched, optionally substituted $C_1$ to $C_{14}$ alkyl radical, an optionally substituted $C_5$ to $C_{12}$ cycloalkyl radical, an optionally substituted $C_6$ to $C_{14}$ aryl radical, an optionally substituted $C_7$ to $C_{18}$ aralkyl radical, an optionally substituted $C_1$ to $C_4$ hydroxyalkyl radical, preferably optionally substituted $C_1$ to $C_2$ hydroxyalkyl radical, or a hydroxyl radical, x represents an integer from 0 to 8, preferably from 0 to 6, particularly preferably 0 or 1 and, if a plurality of radicals R are bound to A, these may be same or different.

More particularly preferred monomeric precursors are optionally substituted 3,4-ethylenedioxythiophenes.

Examples of substituted 3,4-ethylenedioxythiophenes include the compounds of general formula (V)

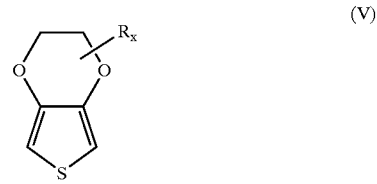

wherein R and x have the meaning given for general formulae (III) and (IV).

Derivatives of these monomeric precursors are understood, according to the invention, to include, for example, dimers or trimers of these monomeric precursors. Higher molecular derivatives, i.e. tetramers, pentamers, etc. of the monomeric precursors are also possible as derivatives.

The compounds of general formula (VI)

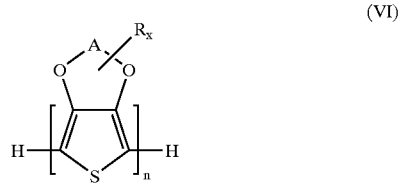

are mentioned as examples of derivatives of substituted 3,4-alkylenedioxythiophenes, wherein n represents an integer from 2 to 20, preferably 2 to 6, particularly preferably 2 or 3, and A, R and x have the meaning given for general formulae (III) and (IV).

The derivatives may be made up of identical or different monomer units and used in pure form and in a mixture with one another and/or with the monomeric precursors. Oxidised or reduced forms of these precursors are also covered by the term "precursors" in the scope of the invention if, during the polymerisation thereof, the same conductive polymers are produced as in the precursors listed above.

The radicals mentioned for R for general formulae (III) and (IV) may be considered as substituents for the precursors, in particular for the thiophenes, preferably for the 3,4-alkylenedioxythiophenes.

The $C_1$ to $C_5$ alkylene radicals A and the optional further substituents of the $C_1$ to $C_5$ alkylene radicals A correspond to those listed above for the polymers of general formulae (I) and (II).

Processes for producing the monomeric precursors for producing conductive polymers and their derivatives are known to the person skilled in the art and described, for example, in L. Groenendaal, F. Jonas, D. Freitag, H. Pielartzik & J. R. Reynolds. Adv. Mater. 12 (2000) 481–494 and the literature cited therein.

The 3,4-alkyleneoxythiophenes of formula (III) required for producing the polythiophenes to be used are known to the person skilled in the art or may be produced by known processes (for example, according to P. Blanchard, A. Cappon, E. Levillain, Y. Nicolas, P. Frere and J. Roncali Org. Lett. 4 (4), 2002, p. 607–609).

The conductive polymers are produced on the electrode body covered by a dielectric by oxidative polymerisation of precursors for producing conductive polymers, in that the precursors, oxidising agents and optionally counterions, preferably in the form of solutions, are applied, either separately in succession or together, to the dielectric of the electrode body, and oxidative polymerisation is completed, optionally by heating the coating, depending on the activity of the oxidising agent used.

Application to the dielectric of the electrode body may take place directly or using an adhesive, for example a silane, such as organofunctional silanes or their hydrolysates, for example 3-glycidoxypropyltrialkoxysilane, 3-aminopropyltriethoxysilane, 3-mercaptopropyltrimethoxysilane, 3-metacryloxypropyltrimethoxysilane, vinyltrimethoxysilane or octyltriethoxysilane, and/or one or more different functional layers.

Polymerisation by chemical oxidation of the thiophenes of formulae (III) or (IV) is generally performed at temperatures of −10° C. to 250° C., preferably at temperatures of 0° C. to 200° C., depending on the oxidising agents used and desired reaction time.

The following organic solvents that are inert under the reaction conditions are primarily mentioned as solvents for the precursors for producing conductive polymers and/or oxidising agents and/or counterions: aliphatic alcohols such as methanol, ethanol, i-propanol and butanol; aliphatic ketones such as acetone and methylethylketone; aliphatic carboxylic acid esters such as ethyl acetate and butyl acetate; aromatic hydrocarbons such as toluene and xylene; aliphatic hydrocarbons such as hexane, heptane and cyclohexane; chlorohydrocarbons such as dichloromethane and dichloroethane; aliphatic nitriles such as acetonitrile, aliphatic sulphoxides and sulphones such as dimethyl sulphoxide and sulpholane; aliphatic carboxylic acid amides such as methylacetamide, dimethylacetamide and dimethylformamide; aliphatic and araliphatic ethers such as diethylether and anisole. Water or a mixture of water with the above-mentioned organic solvents may also be used as the solvent.

Any metal salts suitable for oxidative polymerisation of thiophenes, anilines or pyrroles and known to the person skilled in the art may be used as the oxidising agents.

Suitable metal salts include metal salts of main and subgroup metals, the subgroup metals also being called transition metal salts hereinafter, of the periodic table of elements. Suitable transition metal salts include, in particular, salts of an inorganic or organic acid or inorganic acid of transition metals, such as iron(III), copper (III), chromium (VI), cerium (IV), manganese (IV), manganese (VII) and ruthenium (III), comprising organic radicals.

Preferred transition metal salts include those of iron(III). Conventional iron(III) salts are advantageously inexpensive, easily obtainable and may be easily handled, such as the iron(III) salts of inorganic acids, for example iron(III) halides (e.g. $FeCl_3$) or iron(III) salts of other inorganic acids, such as $Fe(ClO_4)$ or $Fe_2(SO_4)_3$ and the iron(III) salts of organic acids and inorganic acids comprising organic radicals.

The iron(III) salts of sulphuric acid monoesters of $C_1$ to $C_{20}$ alkanols, for example the iron(III) salt of lauryl sulphate, are mentioned as examples of the iron(III) salts of inorganic acids comprising organic radicals.

Particularly preferred transition metal salts include those of an organic acid, in particular iron(III) salts of organic acids.

Examples of iron(III) salts of organic acids include: iron(III) salts of $C_1$ to $C_{20}$ alkane sulphonic acids, such as methane, ethane, propane, butane or higher sulphonic acids such as dodecane sulphonic acid, of aliphatic perfluorosulphonic acids, such as trifluoromethane sulphonic acid, perfluorobutane sulphonic acid or perfluorooctane sulphonic acid, of aliphatic $C_1$ to $C_{20}$ carboxylic acids such as 2-ethylhexylcarboxylic acid, of aliphatic perfluorocarboxylic acids, such as trifluoroacetic acid or perfluorooctane acid and of aromatic sulphonic acids optionally substituted by $C_1$ to $C_{20}$ alkyl groups, such as benzene sulphonic acid, o-toluene sulphonic acid, p-toluene sulphonic acid or dodecylbenzene sulphonic acid and of cycloalkane sulphonic acids such as camphor sulphonic acid.

Any mixtures of these above-mentioned iron(III) salts of organic acids may also be used.

The use of the iron(III) salts of organic acids and of the inorganic acids comprising organic radicals has the great advantage that they are not corrosive.

Iron(III)-p-toluene sulphonate, iron(III)-o-toluene sulphonate or a mixture of iron(III)-p-toluene sulphonate and iron(III)-o-toluene sulphonate are more particularly preferred as the metal salts.

In preferred embodiments, the metal salts have been treated with an ion exchanger, preferably a basic anion exchanger, prior to their use. Examples of suitable ion exchangers include macroporous polymers made of styrene and divinylbenzene functionalised using tertiary amines, as sold, for example, under the trade name Lewatit® by Bayer A G, Leverkusen. The production of such metal salts treated with an ion exchanger is described in DE 103 24 534.

Peroxo compounds such as peroxodisulphates (persulphates), in particular ammonium and alkali peroxodisulphates, such as sodium and potassium peroxodisulphate, or alkali perborates—optionally in the presence of catalytic quantities of metal ions, such as iron, cobalt, nickel, molybdenum or vanadium ions—and transition metal oxides, such as manganese dioxide (manganese(IV) oxide) or cerium(IV) oxide are also suitable oxidising agents.

Theoretically, 2.25 equivalents of oxidising agents are required per mol for the oxidative polymerisation of the thiophenes of formula (III) or (IV) (see for example J. Polym. Sc. Part A Polymer Chemistry vol. 26, p. 1287 (1988)). However, lower or higher equivalents of oxidising agents may also be used. According to the invention, one equivalent or more, particularly preferably two equivalents or more of oxidising agents is/are used per mol of thiophene.

With separate application of precursors, oxidising agents and optionally counterions, the dielectric of the electrode body is preferably initially coated with the solution of the oxidising agents and optionally of the counterions and then with the solution of the precursors. With the preferred joint application of precursors, oxidising agents and optionally counterions, the dielectric of the electrode body is coated with only one solution, namely a solution containing precursors, oxidising agents and optionally counterions.

Further components such as one or more organic binders soluble in organic solvents, such as polyvinyl acetate, polycarbonate, polyvinyl butyral, polyacrylic acid ester, polymethacrylic acid ester, polystyrene, polyacrylonitrile, polyvinylchloride, polybutadiene, polyisoprene, polyether, polyester, silicones, styrene/acrylic acid ester, vinyl acetate/acrylic acid ester and ethylene/vinyl acetate copolymers or water-soluble binders such as polyvinyl alcohols, crosslinking agents such as melamine compounds, masked isocyanates, functional silanes—for example tetraethoxysilane, alkoxysilane hydrolysates, for example based on tetraethoxysilane, epoxy silanes such as 3-glycidoxypropyltrialkoxysilane—polyurethanes, polyacrylates or polyolefin dispersions, and/or additives, such as surface-active substances, for example ionic or non-ionic surfactants or adhesives, such as organic functional silanes or their hydrolysates, for example 3-glycidoxypropyltrialkoxysilane, 3-aminopropyltriethoxysilane, 3-mercaptopropyltrimethoxysilane, 3-metacryloxypropyl-trimethoxysilane, vinyltrimethoxysilane, octyltriethoxysilane, may also be added to the solutions.

The solutions to be applied to the dielectric of the electrode body preferably contain 1 to 30% by weight of the thiophene of general formula (III) or of the mixture of thiophenes of general formulae (III) and (IV) and 0 to 50% by weight binder, crosslinking agent and/or additives, both percentages by weight being based on the total weight of the mixture.

The solutions are applied by known processes, for example by impregnation, pouring, dropwise application, injection, spraying, doctoring, brushing, spin coating or printing, for example ink-jet, screen, contact or pad printing, onto the dielectric of the electrode body.

The solvent may be removed after application of the solutions by simple evaporation at ambient temperature. To achieve higher processing speeds it is, however, more advantageous to remove the solvent at elevated temperatures, for example at temperatures of 20 to 300° C., preferably 40 to 250° C. A thermal post-treatment may be directly connected with removal of the solvent or else also be performed following a delay after completion of the coating.

The duration of the heat treatment is 5 seconds to a plurality of seconds, depending on the type of polymer used for the coating. Temperature profiles with different temperatures and dwell times may also be used for the thermal treatment.

The heat treatment may, for example, be carried out in such a way that the coated oxidised electrode body is moved at such speed through a heat chamber at the desired temperature that the desired dwell time is achieved at the selected temperature or it is brought into contact with a hot plate at the desired temperature for the desired dwell time. The heat treatment may also take place, for example, in a heating furnace or a plurality of heating furnaces with respectively different temperatures.

After removing the solvent (drying) and optionally after thermal post-treatment, it may be advantageous to wash to excess oxidising agents and residual salts from the coating using a suitable solvent, preferably water or alcohols. Residual salts are here taken to mean the salts of the reduced form of the oxidising agents and optionally further salts present.

For metal oxide dielectrics, such as the oxides of the valve metals, it may be advantageous, after polymerisation and preferably during or after washing, to electrochemically imitate the oxide film in order to touch up potential defects in the oxide film and consequently to reduce the leakage current of the finished capacitor. During this reforming process the capacitor body is immersed in an electrolyte and a positive voltage applied to the electrode body. The flowing current imitates the oxide at defective points in the oxide film and destroys conductive polymer at defects over which a high current flows.

Depending on the type of oxidised electrode body, it may be advantageous to impregnate the oxidised electrode body several more times with the mixtures to achieve thicker polymer layers, preferably after a washing process.

The polythiophenes may be produced from the precursors by electrochemical oxidative polymerisation as well.

During electrochemical polymerisation, the electrode body coated with a dielectric may firstly be coated with a thin layer of a conductive polymer. After applying a voltage to this layer, the layer containing the conductive polymer grows thereon. Other conductive layers may also be used as the deposition layer. Thus, Y. Kudoh et al. describe, in Journal of Power Sources 60 (1996) 157–163, the use of a deposited layer of manganese oxide.

The electrochemical oxidative polymerisation of the precursors may be performed at temperatures of −78° C. up to the boiling point of the solvent used. Electrochemical polymerisation is preferably carried out at temperatures of −78° C. to 250° C., particularly preferably from −20° C. to 60° C.

The reaction times are 1 minute to 24 hours depending on the precursor used, the electrolyte used, the selected temperature and the current density applied.

If the precursors are liquid, electropolymerisation may be performed in the presence or absence of solvents that are inert under electropolymerisation conditions. The electropolymerisation of solid precursors is carried out in the presence of solvents that are inert under electrochemical polymerisation conditions. In certain cases it may be advantageous to use solvent mixtures and/or to add solubilisers (detergents) to the solvents.

Examples of solvents that are inert under electropolymerisation conditions include: water; alcohols such as methanol and ethanol; ketones such as acetophenone; halogenated hydrocarbons such as methylenechloride, chloroform, carbon tetrachloride and fluorocarbons; esters such as ethyl acetate and butyl acetate; carbonic acid esters such as propylene carbonate; aromatic hydrocarbons such as benzene, toluene, xylene; aliphatic hydrocarbons such as pentane, hexane, heptane and cyclohexane; nitriles such as acetonitrile and benzonitrile; sulphoxides such dimethylsulphoxide; sulphones such as dimethylsulphone, phenylmethylsulphone and sulpholane; liquid aliphatic amides such as methylacetamide, dimethylacetamide, dimethylformamide, pyrrolidone, N-methypyrrolidone, N-methylcaprolactam; aliphatic and mixed aliphatic-aromatic ethers such as diethylether and anisole; liquid ureas such as tetramethylurea or N,N-dimethylimidazoldinone.

For electropolymerisation, electrolyte additives are added to the precursors or their solutions. Free acids or conventional support electrolytes, that have some solubility in the solvents used, are preferably used as the electrolyte additives. Free acids, such as p-toluene sulphonic acid, methane sulphonic acid, and salts with alkane sulphonate, aromatic sulphonate, tetrafluoroborate, hexafluorophosphate, perchlorate, hexafluoroantimonate, hexafluoroarsenate and hexachloroantimonate anions and alkali, alkaline earth or optionally alkylated ammonium, phosphonium, sulphonium and oxonium cations, for example, have proven themselves as electrolyte additives.

The concentrations of the precursors can lie between 0.01 and 100% by weight (100% by weight only with liquid precursor); the concentrations are preferably 0.1 to 20% by weight.

Electropolymerisation may be carried out discontinuously or continuously.

The current densities for electropolymerisation may vary within wide limits; current densities of 0.0001 to 100 mA/cm$^2$, preferably 0.01 to 40 mA/cm$^2$ are conventionally employed. Voltages of about 0.1 to 50 V are obtained with these current densities.

For metal oxide dielectrics it may be advantageous, after electrochemical polymerisation, to electrochemically imitate the oxide film in order to touch up potential defects in the oxide film and consequently reduce the leakage current of the finished capacitor (reforming).

The monomeric or polymeric anions already mentioned hereinbefore are suitable as counterions, preferably those of the monomeric or polymeric alkane or cycloalkane sulphonic acids or aromatic sulphonic acids. The anions of monomeric alkane or cycloalkane sulphonic acids or aromatic sulponic acids are preferred for application in the electrolytic capacitors according to the invention, as these contained solutions are more capable of penetrating into the porous electrode material coated with a dielectric so a larger contact area between this and the solid electrolyte may be formed. The counterions are added to the solutions, for example in the form of their alkali metal salts or as free acids. During electrochemical polymerisation these counterions are added to the solution or the thiophenes, optionally as electrolyte additives or support electrolytes.

In addition, the optionally present anions of the oxidising agent used may be used as counterions, so an addition of additional counterions is not imperative in the case of chemical oxidative polymerisation.

After producing the solid electrolytes and optionally after applying further layers to the capacitor body, the layer comprising at least one polymeric anion and at least one optionally substituted polyaniline and/or a polythiophene with recurring units of general formula (I), (II) or recurring units of general formula (I) and (II)

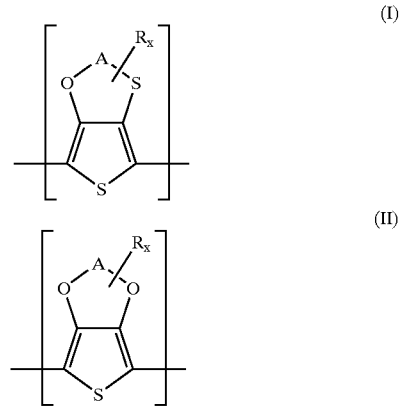

wherein A, R and x have the meaning given above for the general formulae (I) and (II), and at least one binder from a dispersion comprising at least one polymeric anion and at least one optionally substituted polyaniline and/or a polythiophene with recurring units of general formula (I), (II) or recurring units of general formula (I) and (II) and at least one binder, are applied.

The dispersions may also contain one or more solvents. The solvents already mentioned above for the precursors may be used as the solvents. Preferred solvents are water or other protic solvents such as alcohols, for example methanol, ethanol, i-propanol and butanol and mixtures of water with these alcohols, the particularly preferred solvent being water.

The polymeric anions and binders already listed above in conjunction with the electrolytic capacitor according to the invention may be considered as the polymeric anions and binders in the polymeric outer layer. Preferred ranges analogously apply in any combination.

The addition of binders has the great advantage that the adhesion of the outer polymer layer to the capacitor body is increased. The binder also increases the solids content in the dispersion so an adequate outer layer thickness may be achieved even with impregnation, and the edge coverage is much improved.

That already stated above in conjunction with the electrolytic capacitor according to the invention applies to the polythiophenes with recurring units of general formula (I) and/or (II) in the polymeric outer layer. Preferred ranges analogously apply in any combination.

The dispersions comprising at least one polymeric anion and optionally substituted polyaniline and/or at least one polythiophene with recurring units of general formula (I), (II) or recurring units of general formula (I) and (II) may also contain crosslinking agents, surface-active substances, such as ionic or non-ionic surfactants or adhesives, and/or additives. The crosslinking agents, surface-additive substances and/or additives may be used.

The dispersion may also contain monomeric anions.

The dispersions preferably contain further additives that increase the conductivity, for example ether group-containing compounds, such as tetrahydrofuran, lactone group-containing compounds such as γ-butyrolactone, γ-valerolactone, amide or lactam group-containing compounds such as caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, pyrrolidone, sulphones and sulphoxides, such as sulpholane (tetramethylenesulphone), dimethylsulphoxide (DMSO), sugar or sugar derivatives, such as saccharose, glucose, fructose, lactose, sugar alcohols, such as sorbitol, mannitol, furan derivatives, such as 2-furancarboxylic acid, 3-furancarboxylic acid, and/or di- or polyalcohols, such as ethylene glycol, glycerol, di- or triethylene glycol. Tetrahydrofuran, N-methylformamide, N-methylpyrrolidone, dimethylsulphoxide or sorbitol are particularly preferably used as the conductivity-increasing additives.

The dispersions are produced from optionally substituted anilines, thiophenes of general formula (III), (IV) or mixtures of thiophenes of general formulae (III) and (IV), for example analogously to the conditions mentioned in EP-A 440 957. The oxidising agents, solvents and polymeric anions already listed above may be used as the oxidising agents, solvents and polymeric anions.

Production of the polyaniline/polyanion or polythiophene/polyanion complex and subsequent dispersal or redispersal in one or more solvent(s) is also possible.

The dispersions are applied by known processes, for example by spin coating, impregnation, pouring, dropwise application, injection, spraying, doctoring, brushing or printing, for example ink-jet, screen or pad printing, onto the capacitor body.

The viscosity of the dispersion can be between 0.1 and 100,000 mPa·s, depending on the type of application. The viscosity is preferably 1 to 10,000 mPa·s, particularly preferably between 10 and 1,000 mPa·s, more particularly 30 to 500 mPa·s.

When applying the dispersion to the capacitor body by means of steeping, it may be advantageous to allow a thin film of higher viscosity to form on the surface of the dispersion prior to steeping. If the capacitor body is then immersed successively deeper into a dispersion of this type in one or more steeping and drying cycles, coverage of the edges and corners of the capacitor body is much improved and blistering in the dry polymer film is prevented. The capacitor body can thus, for example, be steeped in the dispersion in the first step and then dried. In a second steeping step the capacitor body can then be completely immersed in the dispersion and then dried. The formation of the thin film of higher viscosity on the surface of the dispersion can be achieved by simply allowing it to stand in the open atmosphere. Film formation may be accelerated, for example by heating the dispersion or by heating the dispersion surface with hot air or heat irradiation.

Dispersions comprising at least one polymeric anion and optionally substituted polyaniline and/or at least one thiophene with recurring units of general formula (I), (II) or recurring units of general formula (I) and (II) are preferably used that, in the dry state, have specific conductivity higher than 10 S/cm, particularly preferably higher than 20 S/cm, more preferably higher than 50 S/cm and most preferably higher than 100 S/cm.

Drying, cleaning of the layer by washing, reforming and repeated application, as already described above for the production of solid electrolytes, may also follow application of the polymeric outer layer. Depending on the binder or crosslinking agent used, further treatment steps, such as curing or crosslinking by temperature or light may also be employed. Further layers may also be applied to the polymeric outer layer.

It has surprisingly been found that for metal oxide dielectrics, no further treatment steps of the layer are required after application and drying of the dispersion in order to produce solid electrolytic capacitors with low ESR and low leakage current. In other processes for producing a polymeric outer layer, the oxide layer has conventionally to be reformed after application of the conductive polymeric outer layer to achieve low leakage currents. The polymeric outer layer may detach from the capacitor body at certain points as a result of this reforming in an electrolyte, whereby the ESR is increased. When using the process according to the invention, the reforming process may be dispensed with without the leakage current being increased thereby.

The valve metals or compounds with comparable properties listed above for the electrolytic capacitor are preferably used for producing the electrode body. Preferred ranges apply accordingly.

The oxidisable metals are, for example, sintered in powdered form to form a porous electrode body, or a porous structure is impressed on a metal body. This may also be carried out, for example, by etching a foil.

The porous electrode bodies are, for example, oxidised in a suitable electrolyte, such as phosphoric acid, by applying a voltage. The level of this forming voltage is dependent on the oxide layer thickness to be achieved or the subsequent application voltage of the capacitor. Preferred voltages are 1 to 300 V, particularly preferably 1 to 80 V.

Preferably, metal powders with a charge-mass ratio higher than 35,000 $\mu C/g$, particularly preferably with a charge-mass ratio higher than 45,000 $\mu C/g$, more preferably with a charge-mass ratio higher than 65,000 $\mu C/g$, most preferably with a charge-mass ratio higher than 95,000 $\mu C/g$ are used for producing the electrode body. Metal powders with a charge-mass ratio higher than 140,000 $\mu C/g$ are used in preferred embodiments of the process according to the invention.

The charge-mass ratio is calculated here as follows:

Charge-mass ratio=(capacitance*voltage)/weight of the oxidised electrode body

The capacitance is obtained here from the capacitance of the oxidised electrode body, measured at 120 Hz in an aqueous electrolyte. The electric conductivity of the electrolyte is sufficiently great here, so there is still no capacitance drop at 120 Hz owing to the electric resistance of the electrolyte. 18% aqueous sulphuric acid electrolytes are used, for example, for measuring. The voltage in the above formula corresponds to the maximum forming voltage (oxidation voltage).

Solid electrolytic capacitors with a dense polymeric outer layer with a good edge coverage and adhesion may be produced particularly simply using the process according to the invention. The capacitors are also distinguished by low leakage currents and a low ESR.

The electrolytic capacitors according to the invention and the electrolytic capacitors produced according to the invention are eminently suitable as a component in electronic circuits owing to their low leakage current and their low ESR. Digital electronic circuits of the type found, for example, in computers (desktops, laptops, servers), in portable electronic devices, such as mobile telephones and digital cameras, in electronic entertainment equipment, such as in CD/DVD players and computer games consoles, in navigation systems and in telecommunication devices, are preferred.

EXAMPLES

Example 1

Production of Capacitors According to the Invention

1. Production of Oxidised Electrode Bodies

Tantalum powder with a specific capacitance of 50,000 $\mu$FV/g was compacted into pellets and sintered to form a porous electrode body with dimensions of 4.2 mm*3 mm*1.6 mm. The pellets (anode pellets) were anodised in a phosphoric acid electrolyte to 30 V.

2. Chemical In Situ Coating of the Anode Pellets

A solution, comprising one part by weight 3,4-ethylenedioxythiophene (BAYTRON® M, H. C. Starck GmbH and 20 parts by weight of a 40% ethanolic solution of iron(III)-p-toluenesulphonate (BAYTRON® C-E, H. C. Starck GmbH) was produced.

The solution was used to impregnate 9 anode pellets. The anode pellets were steeped in this solution and then dried for 30 min at ambient temperature (20° C.). They were then heat treated for 15 min at 50° C. and 15 min at 150° C. in a drying oven. The pellets were then washed for 30 min in water. The anode pellets were reformed for 30 min in a 0.25% by weight aqueous solution of p-toluenesulphonic acid then rinsed and dried in distilled water. The described impregnation, drying, heat treatment and reforming were carried out a further two times.

3. Applying a Polymeric Outer Layer

The anode pellets were then steeped in an aqueous dispersion, consisting of 90 parts of an aqueous PEDT/PSS dispersion (BAYTRON® P, H. C. Starck GmbH), 4 parts NMP, 4.2 parts of a sulphonated polyester (Eastek® 1400, solids content 30% by weight in water, Eastman) and 0.2 parts surfactant (Zonyl® FS 300, Du Pont) and dried for 15 min at 80° C.

The pellets were then coated with a graphite and a silver layer.

The 9 capacitors had, on average, the following electrical values:

| | |
|---|---|
| Capacitance: | 147 $\mu$F |
| ESR: | 26 m$\Omega$ |
| Leakage current: | 5 $\mu$A |

The product of geometric surface area and ESR was 1250 m$\Omega$mm$^2$.

For this purpose, the capacitance was determined at 120 Hz and the equivalent series resistance (ESR) at 100 kHz using a LCR meter (Agilent 4284A). The leakage current was determined 3 minutes after application of a 10 V voltage using a Keithley 199 multimeter.

Example 2

Production of Capacitors According to the Invention

Tantalum powder with a specific capacitance of 50,000 $\mu$FV/g was compacted into pellets and sintered to form a porous electrode body with dimensions of 4.2 mm*3 mm*0.8 mm. The pellets (anode pellets) were anodised in a phosphoric acid electrolyte to 30 V.

The chemical in situ coating and application of the polymeric outer layer were carried out according to Example 1 (step 2 and 3).

After application of the polymeric outer layer, the anode pellets were observed under a light microscope: the entire external surface was covered with a dense polymer film. The edges exhibited a continuous polymer film coating.

Figure 3:
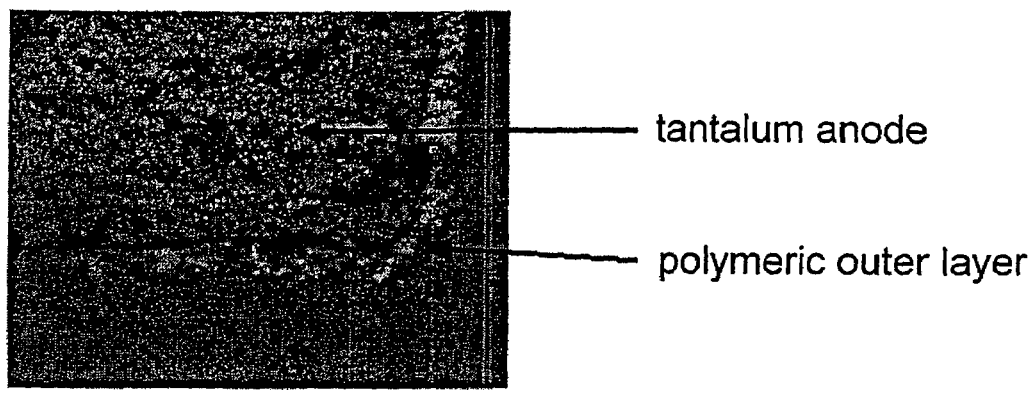
FIG. 3 is representative photograph (obtained by visible light microscopy) of a fractured surface of a capacitor according to the present invention.

FIG. 3 shows a light microscopic photograph of a fractured surface of the capacitor according to the invention. An approximately 5 to 10 $\mu$m thick polymer outer layer that also very effectively surrounds the edge of the capacitor pellet may clearly be seen.

Two of the anode pellets were coated with a graphite and silver layer.

The capacitors according to the invention had an ESR of 15 m$\Omega$ on average. The product of geometric surface area and ESR was 551 m$\Omega$mm$^2$.

Comparison Example 1

Production of Capacitors not According to the Invention without Binder in the Outer Layer 9 capacitors were produced analogously to Example 1 but only the aqueous PEDT/PSS dispersion (BAYTRON® P, H. C. Starck GmbH) without binder and further additives was used for the polymeric outer layer. To achieve a layer of adequate thickness, the pellets were steeped twice and dried.

The polymeric outer layer of PEDT/PSS without binder flaked off when the graphite and silver layer were applied. All capacitors were electrically short-circuited and could not be measured further.

The comparison with Example 1 shows that the addition of binder increases the adhesion of the polymeric outer layer to the porous capacitor body and consequently allows capacitors with low leakage currents.

Comparison Example 2

Production of Capacitors not According to the Invention without in situ Polymerisation 9 capacitors were produced analogously to Example 1 but chemical in situ coating was not performed (only the first and third steps from Example 1).

The capacitors had average capacitance of only 0.9 $\mu$F. The capacitors according to the invention from Example 1 by contrast, at 147 $\mu$F, had capacitance that was approximately 160 times higher. This shows that the PEDT/PSS only penetrates into the porous structure in the edge region of the capacitor body and the polymeric outer layer is located substantially on the external surface of the capacitor body.

Comparison Example 3

Production of Capacitors not According to the Invention with a Polymeric Outer Layer Polymerised in situ A) 9 capacitors were produced analogously to Example 1 but instead of the polymeric outer layer of PEDT/PSS (third step in Example 1), an outer layer polymerised in situ was produced by additionally performing two further impregnation cycles (second step in Example 1), but without reforming in each case.

When a voltage of 10 V was applied, all the capacitors were electrically short-circuited.

B) 9 capacitors were produced analogously to A) but with reforming during the two further impregnation cycles.

3 of the 9 capacitors were short-circuited, the remaining 6 exhibited a leakage current of, on average, 1 µA at 10 V.

This example shows that with an outer layer formed by in situ polymerisation, reforming after application of the outer layer is necessary to achieve low leakage currents. In the capacitors according to the invention from Example 1 this reforming is not necessary. In addition, 33% of the capacitors from Example B were defective, while 100% of the capacitors according to the invention from Example 1 had low leakage currents. The process according to the invention for producing capacitors is therefore not only simpler but also more reliable. Therefore, the yield of functional capacitors in the production process according to the invention is considerably higher.

Example 3

Resistance of Capacitors According to the Invention to Mechanical Stresses

The capacitors according to the invention from Example 1 were contacted on the silver layer by means of a metal spring bolt (spring force 3 N, round bearing surface with diameter of 1.5 mm, bearing pressure approximately 170 N/cm$^2$ or 17 bar) for measuring leakage current.

The leakage current at 10 V increased with this high mechanical stress from, on average, 5 µA to 144 µA.

The capacitors not according to the invention from Example 4A with an outer layer polymerised in situ were subjected to the same stress test. A 10 V voltage could not be applied to the 6 capacitors with a leakage current of 1 µA from Example 4A without electrical short-circuits being produced. Even at 0.5 V the capacitors exhibited an average leakage current of almost 2,000 µA.

This example shows that the capacitors according to the invention have high stability to mechanical stresses.

Example 4

Production According to the Invention of Capacitors with Different Polymeric Dispersions 1. Production of Oxidised Electrode Bodies Tantalum powder with a specific capacitance of 50,000 µFV/g was compacted into pellets and sintered to form a porous electrode body with dimensions of 4.2 mm*3 mm*1.6 mm. The pellets (anode pellets) were anodised in a phosphoric acid electrolyte to 30 V.

2. Chemical in situ Coating of the Anode Pellets

A solution composed of 1 part by weight 3,4-ethylenedioxythiophene (BAYTRON® M, H. C. Starck GmbH) and 20 parts by weight of a 40% by weight ethanolic solution of iron(III)-p-toluenesulphonate (BAYTRON® C-E, H. C. Starck GmbH) was produced.

The solution was used to impregnate 12 anode pellets. The anode pellets were steeped in the solution and then dried for 30 min at ambient temperature. They were then heat treated for 15 min at 50° C. and 15 min at 150° C. in a drying oven. The pellets were then washed for 30 min in water. The anode pellets were reformed for 30 min in a 0.25% by weight aqueous solution of p-toluic acid, then rinsed in distilled water and dried. The described steeping, drying, heat treatment and reforming were carried out two further times.

3. Application of a Polymeric Outer Layer 6 pellets in each case were then steeped in one of the following dispersions and then dried for 15 min at 80° C.

Dispersion A:

90 parts of an aqueous PEDT/PSS dispersion (BAYTRON®) P, H. C. Starck GmbH), 4 parts dimethylsulphoxide (DMSO), 4.2 parts of a sulphonated polyester (Eastek® 1400, solids content 30% by weight in water, Eastman) and 0.2 parts surfactant (Zonyl® FS 300, Du Pont)

Dispersion B:

90 parts of an aqueous PEDT/PSS dispersion (BAYTRON®, P, H. C. Starck GmbH), 4 parts NMP, 4.2 parts of a sulphonated polyester (Eastek® 1400, solids content 30% by weight in water, Eastman) and 0.2 parts surfactant (Zonyl® FS 300, Du Pont)

The pellets were then coated with a graphite and silver layer.

The 6 capacitors had, on average, the following respective electrical values:

|  | Dispersion A | Dispersion B |
| --- | --- | --- |
| ESR in mΩ | 34 | 33 |
| Leakage current in µA | 2.6 | 10 |

The equivalent series resistance (ESR) was determined at 100 kHz using an LCR meter (Agilent 4284A). The leakage current was determined for 3 minutes using a Keithley 199 multimeter after applying a 10 V voltage.

Example 5

Temperature Stability of the Equivalent Series Resistance of Capacitors According to the Invention 4 capacitors from Example 4 produced using dispersion B were stored in a drying oven for 3 min at 260° C.

The ESR after exposure to heat was, on average, 32 mΩ. This shows that the capacitors according to the invention withstand typical exposure to heat that occurs during soldering of capacitors onto printed circuit boards.

Example 6

Production of a Conductive Layer

A conductive layer was produced from dispersion B from Example 4. For this purpose, a portion of the dispersion was spun onto a glass object carrier (26 mm* 26 mm*1 mm) using a spin coater (Chemat Technology KW-4A) at 1,000 rpm for 5 seconds. The sample was dried for 15 min at 80° C. Two opposing edges of the object carrier were then coated with conducting silver. After drying of the conducting silver, the two silver strips were contacted and the surface resistance ascertained using a Keithley 199 multimeter. The layer thickness was determined using a Tencor Alpha Step 500 Surface Profiler. The specific conductivity was ascertained from surface resistance and layer thickness. The layer thickness was 345 nm and the specific conductivity 55 S/cm.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An electrolytic capacitor comprising:
   (a) a porous electrode body comprising an electrode material, said porous electrode body having a surface;
   (b) a dielectric material covering the surface of the porous electrode body, said dielectric material having a surface;
   (c) a solid electrolyte comprising a conductive material preferably a conductive polymer that at least partially covers the surface of said dielectric material, said solid electrolyte having a surface;
   (d) a layer covering the entire external surface or a portion of the external surface of the porous electrode body thereby covering at least a portion of the surface of said solid electrolyte and optionally a portion of the surface of said dielectric material, said layer comprising at least one polymeric anion, and at least one member selected from the group consisting of polyaniline, optionally substituted poylaniline and polythiophene, said polythiophene having recurring units selected from the group consisting of general formula (I), general formula (II) and combinations thereof,

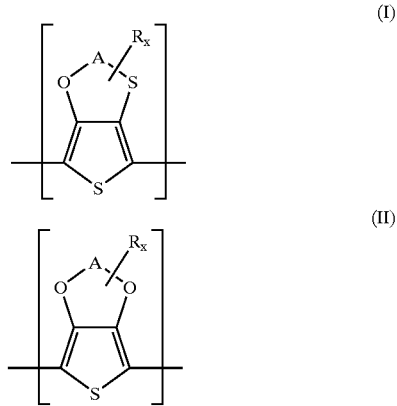

wherein
   A represents a member selected from the group consisting of $C_1$ to $C_5$ alkylene radical and $C_1$ to $C_5$ alkylene radical substituted with at least one member selected from the group consisting of alkyl, cycloalkyl, aryl, halogen, ether, thioether, disulphide, sulphoxide, sulphone, sulphonate, amino, aldehyde, keto, carboxylic acid ester, carboxylic acid, carbonate, carboxylate, cyano, alkylsilane, alkoxysilane and carboxylamide,
   R represents a member selected from the group consisting of linear or branched $C_1$ to $C_{18}$ alkyl radical, $C_5$ to $C_{12}$ cycloalkyl radical, $C_6$ to $C_{14}$ aryl radical, $C_7$ to $C_{18}$ aralkyl radical, $C_1$ to $C_4$ hydroxyalkyl radical and hydroxyl radical,
   x represents an integer from 0 to 8, and provided that if x is at least 2, each R may be the same or different,
wherein layer (d) further comprises at least one binder.

2. The electrolytic capacitor of claim 1 wherein the product of the equivalent series resistance (ESR), measured at 100 kHz, and the geometric surface area of the porous electrode body is less than 4,000 mΩmm$^2$.

3. The electrolytic capacitor of claim 1 wherein the equivalent series resistance (ESR) of said electrolytic capacitor, measured at 100 kHz is less than 50 mΩ.

4. The electrolytic capacitor of claim 1 wherein the conductive material of the solid electrolyte (c) is a polymer selected from the group consisting of optionally substituted polythiophene, optionally substituted polypyrrole, optionally substituted polyaniline and combinations thereof.

5. The electrolytic capacitor of claim 1 wherein the conductive material of the solid electrolyte (c) is a polythiophene having recurring units selected from the group consisting of general formula (I), general formula (II) and combinations thereof.

6. The electrolytic capacitor of claim 1 wherein the solid electrolyte (c) comprises monomeric anions.

7. The electrolytic capacitor of claim 1 wherein the conductive material of the solid electrolyte (c) is a charge transfer complex, manganese dioxide or a salt.

8. The electrolytic capacitor of claim 1 wherein the polythiophene contained in said layer (d) is poly(3,4-ethylenedioxythiophene).

9. The electrolytic capacitor of claim 1 wherein the polymeric anion contained in said layer (d) is an anion of a member selected from the group consisting of polymeric carboxylic acid and polymeric sulphonic acid.

10. The electrolytic capacitor of claim 9 wherein the polymeric anion contained in said layer (d) is an anion of polystyrene sulphonic acid.

11. The electrolytic capacitor of claim 1 wherein the binder of said layer (d) is a polymeric organic binder.

12. The electrolytic capacitor of claim 1 wherein the solid electrolyte (c) comprises a poly(3,4-ethylenedioxythiophene) and monomeric counterions, and said layer (d) comprises a poly(3,4-ethylenedioxythiophene)/polystyrene sulphonic acid complex and at least one polymeric organic binder.

13. The electrolytic capacitor of claim 1 wherein the electrode material of said porous electrode (a) is selected from at least one valve metal or a compound with electrical properties of a valve metal.

14. The electrolytic capacitor of claim 13 wherein the valve metal is selected from the group consisting of tantalum, niobium, aluminium, titanium, zirconium, hafnium, vanadium, an alloy of at least one of these metals with other elements, a compound of at least one of these metals with other elements, NbO, an alloy of NbO with other elements, a compound of NbO with other elements, and combinations thereof.

15. The electrolytic capacitor of claim 14 wherein the dielectric material (b) is an oxide of the valve metal or of a compound with electrical properties of a valve metal of the electrode material of said porous electrode body.

16. The electrolytic capacitor of claim 1 wherein the electrolytic capacitor has a charge-to-mass ratio higher than 10,000 μC/g, based on the weight of the porous electrode body coated with said dielectric material.

17. The electrolytic capacitor of claim 1 wherein the mean layer thickness of layer (d) is 1 to 100 μm.

18. A method of preparing an electrolytic capacitor comprising,
   (a) a porous electrode body comprising an electrode material, said porous electrode body having a surface;

(b) a dielectric material covering the surface of the porous electrode body, said dielectric material having a surface; optionally coated with further layers (c) a solid electrolyte comprising a conductive polymer that at least partially covers the surface of said dielectric material, said solid electrolyte having a surface;

(d) a layer covering at least a portion of the surface of said solid electrolyte and optionally a portion of the surface of said dielectric material, said layer comprising at least one polymeric anion, and at least one member selected from the group consisting of polyaniline and polythiophene, said polythiophene having recurring units selected from the group consisting of general formula (I), general formula (II) and combinations thereof,

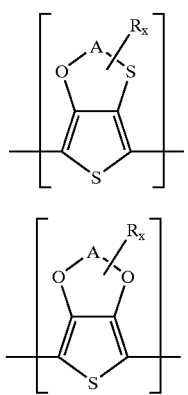

wherein

A represents a member selected from the group consisting of $C_1$ to $C_5$ alkylene radical and $C_1$ to $C_5$ alkylene radical substituted with at least one member selected from the group consisting of alkyl, cycloalkyl, aryl, halogen, ether, thioether, disulphide, sulphoxide, sulphone, sulphonate, amino, aldehyde, keto, carboxylic acid ester, carboxylic acid, carbonate, carboxylate, cyano, alkylsilane, alkoxysilane and carboxylamide, R represents a member selected from the group consisting of linear or branched $C_1$ to $C_{18}$ alkyl radical, $C_5$ to $C_{12}$ cycloalkyl radical, $C_6$ to $C_{14}$ aryl radical, $C_7$ to $C_{18}$ aralkyl radical, $C_1$ to $C_4$ hydroxyalkyl radical and hydroxyl radical, x represents an integer from 0 to 8, and provided that if x is at least 2, each R may be the same or different, wherein layer (d) further comprises at least one binder, said process comprising:

(I) forming said solid electrolyte (c) by a method selected from the group consisting of,
applying, together or in succession, with or without in the form of a solution, to said surface of said dielectric material,
precursors of conductive polymers,
at least one oxidizing agent, and
optionally counterions, and
polymerizing the applied materials by means of chemical oxidation at a temperature of −10° C. to 250° C., and
applying, together or in succession, with or without in the form of a solution, to said surface of said dielectric material,
precursors of conductive polymers, and
counterions, and
polymerizing electrochemically the applied materials at a temperature of −78° C. to 250° C.; and (II) forming layer (d) by applying, to at least a portion of the external surface of said solid electrolyte and optionally a portion of the surface of said dielectric material, a dispersion comprising said binder, at least one polymeric anion, and at least one member selected from the group consisting of optionally substituted polyaniline and polythiophene, said polythiophene having recurring units selected from the group consisting of general formula (I), general formula (II) and combinations thereof.

19. The process of claim 18 wherein said precursors of conductive polymers are selected from the group consisting of optionally substituted thiophenes, optionally substituted pyrroles, optionally substituted anilines and combinations thereof.

20. The process of claim 18 wherein said precursor of conductive polymers is 3,4-ethylenedioxythiophene.

21. The process of claim 18 wherein said oxidizing agent is selected from the group consisting of alkali peroxide sulphates, ammonium peroxide sulphates, hydrogen peroxide, alkali perborates, iron-III salts of organic acids, iron-III salts of inorganic acids, iron-II salts of inorganic acids, that comprise organic radicals and combinations thereof.

22. The process of claim 18 further comprising, optionally drying said solid electrolyte after polymerization, and washing said solid electrolyte with solvents.

23. The process of claim 18 wherein said electrode material of said porous electrode body is a metal, and said dielectric material is an oxide of the metal of said electrode material, said process further comprising electrochemically post-anodizing said oxide.

24. The process of claim 22 wherein said porous electrode body is a metal, and said dielectric material is an oxide of the metal of said electrode material, said process further comprising electrochemically post-anodizing said oxide, and further wherein the steps of forming said solid electrolyte (c), optional drying said solid electrolyte, and washing said solid electrolyte with solvents, and electrochemically post-anodizing said oxide are performed a plurality of times in sequence.

25. The process of claim 18 wherein the counterions are selected from the group consisting of anions of monomeric alkane sulphonic acids, anions of cycloalkane sulphonic acids, anions of aromatic sulphonic acids and combinations thereof.

26. The process of claim 18 wherein said dispersion that is applied to form layer (d) further comprises a solvent selected from the group consisting of organic solvent, water and combinations thereof.

27. The process of claim 26 wherein said dispersion comprises a member selected from the group consisting of crosslinking agents, surface-active substances, at least one additive and combinations thereof.

28. The process of claim 27 wherein said additive is selected from the group consisting of ether, lactone, amides, lactams, sulphones, sulphoxides, sugars, sugar derivatives, sugar alcohols, furan derivatives, di-alcohols, poly-alcohols and combinations thereof.

29. The process of claim 18 wherein said porous electrode body is fabricated from a powder having a charge-mass ratio higher than 35,000 $\mu C/g$.

30. An electronic circuit comprising the electrolytic capacitor of claim 1.

* * * * *